Patented Jan. 25, 1927.

1,615,584

UNITED STATES PATENT OFFICE.

FABRICE RENÉ HERVÉ, MAXIME HERVÉ, AND ANDRÉ HERVÉ, OF LEVALLOIS-PERRET, FRANCE.

SIZING COMPOSITION FOR COATING PURPOSES.

No Drawing. Application filed July 16, 1925, Serial No. 44,091, and in France June 16, 1925.

Ordinarily to varnish or paint any surface whatsoever the varnish or paint is applied either directly on the surface to be covered or over a filler or first coating which latter is employed in order to present a smooth surface upon which the varnish or paint is applied.

In a comparatively short time, however, the varnish or paint so applied cracks, scales, peels and finally disintegrates under the influence of shocks, rain, temperature, or other external destructive agents.

This deflect is due to the fact that the filler or first coating never adheres perfectly to the surface it covers, nor does the varnish or paint when applied directly on the surface.

The object of the present invention is a process by which a perfect adherence of varnish or paint is obtained on the surface of any object in metal, wood, glass, porcelain, leather, cardboard, paper, etc., destined for any use. The varnish or paint applied by this process becomes a part of the object covered and, in addition to other quanlities, possesses great flexibility, great resistance to scratching or marring, and does not crack nor scale under the influence of ordinary shocks or other deteriorating agents which affect varnish or paint applied by other processes. According to the nature of the varnish or paint used with this process it is impervious to water, oil, gasoline or petrol and is capable of resisting temperature up to 100 degrees centigrade.

The process consists in first covering the surface to be varnished or painted with a coating consisting of a composition which adheres perfectly to any surface upon which it is applied, and then to apply on the said coating any ordinary varnish or paint in common use which latter will then adhere perfectly to the surface it covers.

This adherent coating or composition is the characteristic of the invention. It is obtained in the following manner:

Dissolve an albuminoid substance, such as casein, in a solution of an alkaline salt, such as bicarbonate of soda, so as to obtain a syrupy consistency. The amount of alkaline salt solution should be slightly in excess of the quantity necessary to dissolve the albuminoid substance.

An appropriate quantity of powdered aluminium or other metal or alloy having similar properties is then added which addition produces the following chemical reaction:

The powdered aluminium or other similar metal or alloy employed is decomposed cold by the excess quantity of the alkaline salt solution, the hydrogen contained is freed, and there is formed a caseinate of aluminium or a corresponding substance according to the albuminoid and metal employed, thus:—casein+soda+aluminum=soda caseinate+aluminum soda Caseinate+aluminum=casein—aluminate of soda+hydrogen.

It is this substance which constitutes the adherent coating to be applied to the surface of any material to be varnished or painted. It can be applied by a brush, aerograph, or by any other method, either unadulterated or mixed with an inert matter. After this adherent coating is dry the varnish or paint is applied in the usual manner and, according to the nature of the varnish or paint used, it will present the qualities and properties hereinbefore indicated.

A sample formula of the adherent coating described is as follows: water, 100 parts by weight; an albuminoid substance and an alkaline salt, mixed, about 40 parts by weight.

After dissolving these materials in the water to a syrupy consistency there is added, under the conditions and for the purposes indicated above, about four (4) grams of the powder of aluminium or other metal or alloy having similar properties.

The proportions indicated are in no sense to be considered as limitative and they may be modified or changed at the will of the inventors according to the nature of the object to be varnished or painted.

The invention includes within its scope any albuminoid substance as well as the particular alkaline salt which will most readily and perfectly dissolve it, and any metal the use of which in combination with the solution will produce an adherent coating for any surface to be varnished or painted.

The adherent coating herein described can be also used advantageously, either alone or mixed with an inert matter pulverized or in the form of minute particles, for the purpose of repairing or stopping up the cracks, holes or channels, and like operations, in wood, metal, or other materials. The parts so repaired and then sandpapered or pumiced and polished present a smooth and very hard and durable surface.

Claims.

1. A coating composition of the character described, comprising an albuminoid substance dissolved in an alkaline salt solution and a powdered metal decomposed by an excess quantity of the solution so as to free the hydrogen and form a caseinate of the said metal.

2. A composition according to claim 1 in which the metal decomposed by the salt solution is powdered aluminum.

3. A composition according to claim 1, having added thereto an appropriate inert substance adapted to serve as a filler for interstices in the substance being coated.

In testimony whereof we affix our signatures.

FABRICE RENÉ HERVÉ.
MAXIME HERVÉ.
ANDRÉ HERVÉ.